Aug. 30, 1960  J. M. PERRAUT  2,950,572
DELIVERY DEVICE IN THE DRAWING OF GLASS
Filed Sept. 27, 1955  2 Sheets-Sheet 1

INVENTOR.
JEAN MARCEL PERRAUT
BY Bauer and Seymour
ATTORNEYS

Aug. 30, 1960 J. M. PERRAUT 2,950,572
DELIVERY DEVICE IN THE DRAWING OF GLASS
Filed Sept. 27, 1955 2 Sheets-Sheet 2

INVENTOR.
JEAN MARCEL PERRAUT
BY
Bauer and Seymour
ATTORNEYS.

United States Patent Office 2,950,572
Patented Aug. 30, 1960

2,950,572
DELIVERY DEVICE IN THE DRAWING OF GLASS

Jean Marcel Perraut, Chambery, France, assignor to Compagnie de St. Gobain, Paris, France Filed Sept. 27, 1955, Ser. No. 536,996

Claims priority, application France Sept. 29, 1954

7 Claims. (Cl. 49—61)

This invention relates to delivery devices employed in drawing glass into sheets by the Fourcault process.

As is known, the standard delivery device is an elongated parallelopipedical element of refractory material called a "draw bar" traversed by a longitudinally extending slit which is widened in the downward direction. This slit is bounded by two lateral walls disposed symmetrically with respect to the median plane of the sheet of glass being drawn, referred to herein as "the median drawing plane," its edges at the lower face of the delivery device forming an orifice, termed the intake orifice, through which the molten glass in the tank gains access to the slit and its edges at the upper face, termed the discharge orifice forming another orifice through which the glass is drawn.

When the delivery device is dipped into the fused bath, the glass protrudes out of the upper orifice to form a bulb extending on both sides of the median drawing plane and it is from this bulb that the sheet of glass is drawn.

The principal defect of flat glass obtained by drawing through such draw bars is the presence of distortion resulting from thickenings, more or less extensive and out of the plane, existing in the surfaces of the glass. It is an object of this invention to reduce the magnitude of such thickenings and thus to improve such drawn glass. Another object is to improve the yield of glass in such furnaces. Another object is to improve the shape of the slits in such draw bars.

The objects of the invention are accomplished generally speaking by a draw bar for a Fourcault-type furnace composed of refractory material adapted to the drawing of glass having a drawing slit unsymmetrical with respect to the median drawing plane, and in its preferred form by a glass furnace which has a refractory draw bar located in a drawing well, said draw bar having a flared slit of which the intake orifice is located entirely to one side of the median drawing plane. In the preferred form, the walls of the slit are curved on different radii, producing a flare which displaces the intake orifice with respect to the median drawing plane as compared with the common practice. On the other hand, the slit may be composed of diverging planes which also produce a displacement of the intake orifice with respect to the median drawing plane.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention, reference for this latter purpose being had primarily to the appended claims.

In the drawing, wherein like reference characters refer to like parts throughout the several views.

Figure 3:
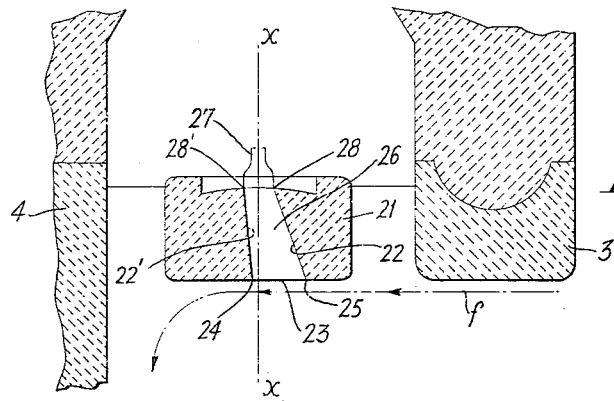
Fig. 3 is a vertical cross section through another embodiment of the invention.

Referring now to the numerals in the drawing, in each of Figs. 1 to 5, inclusive, the numeral 4 indicates the refractory wall of the glass furnace at the discharge end toward which the glass $f$ progresses along the furnace, as indicated by the arrows, beneath the dipping bridge 3 into the drawing well 1. In the standard Fourcault type furnace of the prior art the glass sheet is drawn upward through the draw bar through the slit, the lateral walls of which are flared from top to bottom, the flare being symmetrical with respect to the axial plane through the discharge orifice which is established by the intersection of the flared walls with the bottom of a depressed area formed in the top of the draw bar and extending beyond the ends of the slit. The orifice establishes the size of the bulb which forms above the orifice as the glass is drawn and the size of the bulb establishes the length and thickness of the flat glass sheet withdrawn from the furnace. The discharge orifice and the intake orifice are symmetrical with respect to the median, vertical plane through the drawbar.

Figure 1:
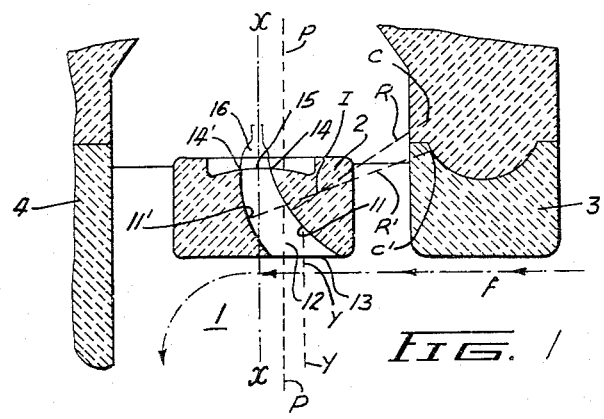
Fig. 1 is a section showing a draw bar constructed in accordance with the principles of the invention.
Figure 2:
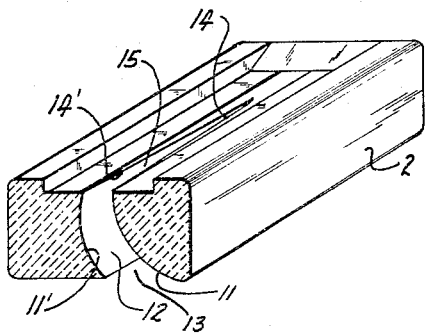
Fig. 2 is a view in perspective section of the draw bar of Fig. 1.

In the form of the invention shown in Figs. 1 and 2, the lateral walls 11—11' of the slit 12 are not symmetrical with respect to the plane $x$—$x$, but are displaced to one side thereof, being shown as directed upstream in Fig. 1. The intake orifice 13 is, therefore, displaced with respect to a plane established by the direction of the flat glass drawn from discharge orifice 15. The glass flowing through the slit 12 forms the bulb 16.

In the form of the invention of Figs. 1 and 2 the walls 11—11' are curved. As shown, both edges of the intake orifice are displaced to one side of the median drawing plane but the displacement need not be so great.

In the first described embodiment of the draw bar of the invention, as shown in Fig. 2, perpendiculars to the centers of the walls 11 and 11' meet on one side of the draw bar. Thus the radii R and $R_1$ to the centers of such walls, respectively, meet at the point I, which lies on one side of the draw bar. Radii R, $R_1$ have centers C and $C_1$, also as shown in Fig. 2. The vertical plane X—X extends through the longitudinal axis of the upper orifice, and the plane Y—Y passes through the longitudinal axis of the lower orifice. Such planes are laterally spaced, so that they lie on opposite sides of a vertical plane P—P passing longitudinally through the draw bar.

In the first described embodiment of the draw bar of the invention, both lateral walls 11 and 11' are curved. As will be understood in connection with the further embodiments shown in Figs. 3, 4 and 5, both such lateral walls can be flat, or one wall may be curved and the other flat, if desired, so long as the intake orifice is not located symmetrically with respect to the median drawing plane.

In the embodiment of Fig. 3, the draw bar 21 has a slit 26 therethrough, the lateral walls 22 and 22' of the slit both being flat. In this embodiment, lateral wall 22' is inclined to the vertical at a small angle opposite the horizontal direction of flow $f$ of the glass in the furnace, the lower edge 24 of wall 22' lying a short distance to the left of median vertical plane $x$—$x$. Lateral wall 22 lies inclined to the vertical in the same direction as, and to a greater angle than, wall 22', so that the lower edge 25 of wall 22 lies at a marked distance to the right of the plane $x$—$x$. As a result, the intake orifice 23 of the slit is disposed unsymmetrically relative to plane $x$—$x$.

Figure 4:
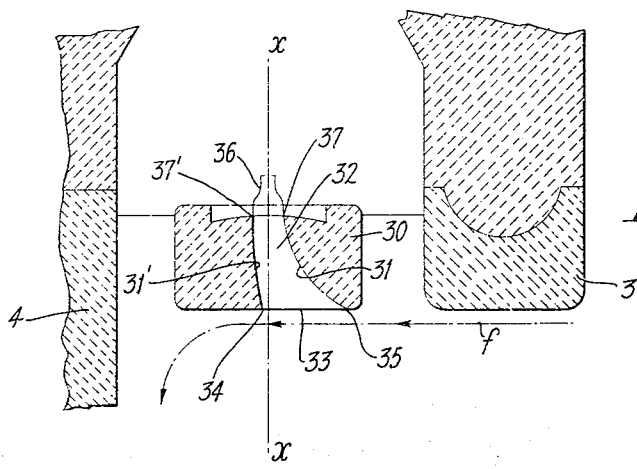
Fig. 4 is a vertical cross section through yet another embodiment.

In the embodiment of Fig. 4, both lateral walls 31 and 31' of slit 32 in draw bar 30 are curved. The lower edge 34 of wall 31' lies slightly to the side of plane x—x, wall 31' being shallowly curved. Wall 31, however, inclines sharply downwardly and to the right, so that its lower edge 35 lies a marked distance to the right of plane x—x. As a result, the intake orifice 33 of slit 32 is disposed unsymmetrically with respect to the median drawing plane.

Figure 5:
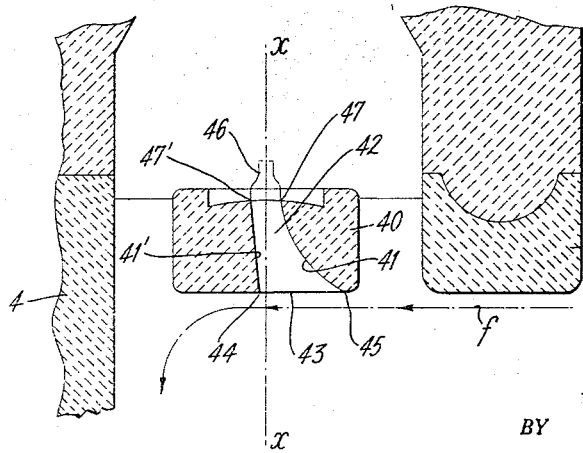
Fig. 5 is a vertical cross section through yet another embodiment.

In the fourth illustrative embodiment of the invention shown in Fig. 5, lateral wall 41' thereof is flat, being of substantially the same configuration and location as wall 22' of the draw bar of Fig. 3. The opposite lateral wall 41 is curved and inclines sharply downwardly to the right, being generally similar to wall 31 of the draw bar of Fig. 4. Thus in Fig. 5, the intake orifice 43 of slit 42 is disposed unsymmetrically with respect to plane x—x.

The applicants have established that the shaping of the delivery device in accordance with this invention has the effect of improving the quality of the sheets of glass drawn.

In this connection, it is known that the principal defect in sheets of glass obtained by drawing with the aid of the known delivery devices is a distortion resulting from variations in thickness. The employment of the delivery devices according to the invention reduces the magnitude of the slopes or pitch of the distortion substantially and consequently reduces the distortion.

It is known, on the other hand, that the length and profile of the slit of a Fourcault delivery device are determined as a function of a given thickness of the sheet to be produced and that sheets manufactured to a greater thickness than that which normally corresponds to the slit exhibit an excessive thickness over their central portion. This excess thickness increases with the thickness of the sheet and it may attain $4/10$ of a millimetre. However, the applicants have established that when a delivery device according to the invention is utilised, this variation in thickness is only of the order of $1/10$ mm.

Another advantage of this invention is that the glass may be drawn through the draw bar more quickly and that an improvement on the order of 10% of the yield of the furnace is obtained, compared to the production of the same furnace using the prior art draw bar. Still further, the invention enables one to increase the width of the sheet drawn by about 3%.

As many apparently widely different embodiments of the present invention may be made without departing from the spirit and scope thereof, it is to be understood that the invention is not limited to the specific embodiments.

What is claimed is:

1. A debiteuse or floating draw bar of elongated shape having a slot parallel to its length and a rim raised above the level of the slot, said draw bar being adapted to be depressed in glass until the glass while remaining below the level of the rim flows through the slot in the form of a thick ribbon which can be drawn away, the slot having an upper orifice below the rim, and having a lower orifice the edges of which are parallel to the rim and are adapted to be horizontally positioned when in operation, the upper and lower orifices of the slot having longitudinal axes which are located on opposite sides of a vertical plane passing longitudinally through the draw bar.

2. The draw bar of claim 1 in which the lower orifice is wider than the upper orifice and lies mainly to one side of a vertical plane passing through the longitudinal axis of the upper orifice.

3. The draw bar of claim 1 in which the lower orifice is wider than the upper orifice and lies wholly to one side of a vertical plane passing through the longitudinal axis of the upper orifice.

4. The draw bar of claim 2 in which the width of the slot is reduced progressively from the lower to the upper orifice by walls, perpendiculars to the centers of which walls meet on one side of the draw bar.

5. The draw bar of claim 2 in which the width of the slot is reduced progressively from the lower to the upper orifice by smoothly curved walls having radii extending toward the same side of the draw bar.

6. The draw bar of claim 1 in which both walls of the slot are inclined from the vertical in the same direction.

7. A debiteuse or floating draw-bar of elongated shape having a longitudinal slot and a rim around said slot, said draw-bar being adapted to be depressed in glass until the glass flows through the slot in the form of a thick ribbon which can be drawn away, the slot having an upper orifice the edges of which lie in a single plane and having a lower orifice the edges of which lie in a plane substantially parallel to said plane and adapted to be horizontally positioned when in operation, the upper and lower orifices having longitudinal axes which are located in different parallel vertical planes.

References Cited in the file of this patent

UNITED STATES PATENTS

| 918,323 | Hitchock | Apr. 13, 1909 |
| 1,184,996 | Raspillaire | May 30, 1916 |
| 1,515,174 | Rowart | Nov. 11, 1924 |
| 1,670,247 | Ferngren | May 15, 1928 |
| 1,818,205 | Drake | Aug. 11, 1931 |
| 2,259,716 | Zellers | Oct. 21, 1941 |

FOREIGN PATENTS

| 8,205 | France | Sept. 16, 1907 |
| 678,655 | Germany | June 29, 1939 |
| 697,216 | Germany | Sept. 12, 1940 |